United States Patent
Kato

(12) United States Patent (10) Patent No.: US 6,485,197 B1
(45) Date of Patent: *Nov. 26, 2002

(54) OPTICAL SEMICONDUCTOR MODULE AND PROCESS FOR PRODUCING THE SAME

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,906

(22) Filed: Mar. 30, 2000

(30) Foreign Application Priority Data

Feb. 4, 1999 (JP) .......................................... 11-095745

(51) Int. Cl.⁷ .................................................. G02B 6/36
(52) U.S. Cl. ........................... 385/92; 385/94; 257/684; 438/116; 438/118
(58) Field of Search .............................. 385/94, 88, 92; 257/678, 680, 684; 438/106, 116, 118

(56) References Cited

U.S. PATENT DOCUMENTS

| | | |
|---|---|---|
| 5,048,912 A | 9/1991 | Kunikane et al. ............. 385/23 |
| 5,670,826 A * | 9/1997 | Bessho et al. ............. 257/737 |
| 6,067,392 A * | 5/2000 | Wakami et al. ............. 385/37 |
| 6,130,444 A * | 10/2000 | Hashizume et al. .......... 257/81 |
| 6,313,525 B1 * | 11/2001 | Sasano ...................... 257/678 |

FOREIGN PATENT DOCUMENTS

| | | | |
|---|---|---|---|
| EP | 0399684 | 11/1990 | ............ G02B/6/42 |
| EP | 0644442 | 3/1995 | ............ G02B/6/40 |
| EP | 0704731 | 4/1996 | ............ G02B/6/42 |
| EP | 0872748 | 11/1999 | ............ G02B/6/42 |
| JP | 6-1290413 | 12/1986 | ............ G02B/6/42 |
| JP | 8-335744 | 12/1996 | ............. H01S/3/18 |
| JP | 9-69585 | 3/1997 | ........... H01L/23/10 |
| JP | 9-148592 | 6/1997 | ........... H01L/31/02 |

* cited by examiner

*Primary Examiner*—Cassandra Spyrou
*Assistant Examiner*—Euncha Cherry
(74) *Attorney, Agent, or Firm*—Haynes Soloway P.C.

(57) ABSTRACT

An optical semiconductor module has a housing having an opening, and an optical semiconductor element is set in the housing. An optical fiber that penetrates the opening is disposed. The optical fiber is allowed to perform optical transmission between the optical semiconductor element and elements arranged outside the housing. The opening is sealed with a photo-curing resin, and a transparent plate is arranged between the photo-curing resin and the outside of the housing.

12 Claims, 6 Drawing Sheets

OPTICAL SEMICONDUCTOR MODULE AND PROCESS FOR PRODUCING THE SAME

BACKGROUND OF THE INVENTION

1. Field of the Invention

The present invention relates to an optical semiconductor module comprising an optical element composed of a light emitting element (a laser diode: LD) or a light receiving element (a photodiode: PD), and an optical fiber optically connected to the optical element; and a process for producing the same. The present invention relates specifically to an optical semiconductor module making it possible to attain airtight sealing easily and surely, and a process for producing the same.

2. Description of the Related Art

As optical fiber communication has been spreading recently, for an optical semiconductor module used in the optical fiber communication, a low-priced module whose assembly process is made simple has been demanded. For this purpose, there is generally used a module wherein a semiconductor laser element as a light emitting element and an optical fiber are mounted on a single Si substrate. In this case, the strand of the optical fiber is bonded to a "V"-shaped groove made in the Si substrate at a given position with a resin or a solder material (such as AuSn) as an adhesive agent, and is fixed with an optical fiber-pressing plate. The optical fiber is drawn out from an optical fiber drawing-out mouth made in a housing to the outside of the housing. As a sealing material for the optical fiber drawing-out mouth, there is used a solder paste comprising AuSn, PbSn or the like, a low melting-point glass or a resin.

However, in the case that the solder paste is used, in order to enhance close adhesion between the optical fiber and the solder paste, it is necessary that a surface of the optical fiber is subjected to metal processing such as Au plating. Thus, the number of processing steps increase. For this reason, the optical semiconductor module becomes high-priced. In the case that the low melting-point glass is used, it is necessary to heat the optical fiber drawing-out mouth up to 430–470° C., at which the low melting-point glass is melted. Therefore, the solder paste with which the optical fiber is fixed to the substrate in the housing is melted so that the positional relationship between the semiconductor laser and the optical fiber gets off. As a result, there arises a problem that a desired optical fiber output cannot be obtained.

Thus, Japanese Patent Application Laid-Open No. 9-69585 discloses a process using resin as a process for sealing an optical fiber drawing-out mouth. FIG. 6 is a sectional view showing a conventional optical semiconductor module in the Japanese Patent Application Laid-Open No. 9-69585. In this conventional optical semiconductor module, a part of a semiconductor laser array 301 is fixed to a "V"-shaped groove formed in a Si substrate 303. An optical fiber array 343 is fixed to the Si substrate 303 with a fiber array-pressing plate 306 on the array 343. The Si substrate 303 is fixed to a bottom of a case 308 with AuSn solder paste. A cap 309 is located on the case 308. A fiber drawing-out mouth 310 is made in a housing composed of the case 308 and the cap 309. One end of the optical fiber array 343 is drawn out from the fiber drawing-out mouth 310 to the outside of the housing.

Thermosetting resin 312 is beforehand applied to the fiber drawing-out mouth 310. By heating the case 308 and the cap 309, the thermosetting resin 312 is cured to seal the fiber drawing-out mouth 310. Grooves 311 for storing liquid resin are made in the fiber drawing-out mouth 310 in such a manner that the thermosetting resin 312 does not leak out by the thermal expansion of the inside of the housing.

Japanese Patent Application Laid-Open No. 9-148592 discloses a process for sealing such a fiber drawing-out mouth as above, using resin having both photo-curing and thermosetting properties.

However, in the conventional optical semiconductor module disclosed in the Japanese Patent Application Laid-Open No. 9-69585, the structure of the optical fiber drawing-out mouth 310 formed in the case 308 and the cap 309 is complicated. Therefore, the number of steps for producing the case 308 and the cap 309 is increased. Thus, there arises a problem that the optical semiconductor module becomes high-priced. Since the thermosetting resin 312 does not flow uniformly into the grooves 311 for storing liquid resin, air bubbles are incorporated into the thermosetting resin 312. Thus, when the resin 312 is cured, air-releasing paths are formed inside the resin 312. Therefore, moisture enters easily from the outside to the inside of the optical semiconductor module via these air-releasing paths. Thus, there also arises a problem that the optical semiconductor element (the laser array 301) inside the optical semiconductor module 300 is broken and the reliability thereof drops.

The process disclosed in the Japanese Patent Application Laid-Open No. 9-148592 has a problem that the number of assembly steps increases by the double process composed of an photo-curing process based on irradiation with ultraviolet rays and a thermosetting process so that the optical semiconductor module becomes high-priced.

SUMMARY OF THE INVENTION

An object of the present invention is to provide an optical semiconductor module making it possible to attain airtight sealing easily and surely and improve reliability at a low price; and a process for producing the same.

According to one aspect of the present invention, an optical semiconductor module comprises: a housing having an opening; an optical semiconductor element provided in the housing; an optical fiber that penetrates the opening, the optical fiber performing optical transmission between the optical semiconductor element and an element arranged outside the housing; photo-curing resin sealing the opening; and a transparent plate arranged between the photo-curing resin and the outside of the housing.

Since the opening that the optical fiber penetrates is sealed with the photo-curing resin in the present invention, air bubbles and the like are not produced and airtight sealing is certainly ensured. Thus, the reliability of the module is high. Since ultraviolet rays are radiated to the photo-curing resin through the transparent plate so that the photo-curing resin is cured, the number of producing steps can be decreased and costs can be reduced.

In the present invention, the housing may comprise a case on which the optical semiconductor element is put, and a cap fitted onto this case, and the difference between the linear expansion coefficient of the photo-curing resin and that of the case may be less than $1 \times 10^{-5}/°C$. By setting the difference between the linear expansion coefficients to less than $1 \times 10^{-5}/°C$., it is possible to prevent generation of cracks based on a change in external temperature or the like, and improve certainty of airtight sealing.

The light transmission ratio of the transparent plate may be equal to or more than 98%. By setting the light transmission ratio of the transparent plate to 98% or more, it is possible to cure the photo-curing resin for fixing the optical fiber core line still more easily.

The opening may comprise a concave opening portion having at least two stages, and the optical fiber and the transparent plate may be arranged on different stages from each other.

According to another aspect of the present invention, the process for producing an optical semiconductor module comprises the steps of: putting an optical semiconductor element inside a case; and arranging an optical fiber in the case. The optical fiber performs optical transmission between the optical semiconductor element and an element arranged outside the case. The process further comprises the steps of: providing photo-curing resin to areas where side walls of the case and the optical fiber cross each other; putting a transparent plate on the photo-curing resin; and radiating light onto the photo-curing resin through the transparent plate to cure the photo-curing resin.

In the process according to the present invention, the optical fiber is fixed to the case by curing the photo-curing resin. Thus, the number of producing steps is reduced, and air bubbles are not incorporated so that the reliability of the module is high.

In the process, the difference between the linear expansion coefficient of the photo-curing resin and that of the case may be less than $1 \times 10^{-5}/°C.$, and the light transmission ratio of the transparent plate may be equal to or more than 98%.

BRIEF DESCRIPTION OF THE PREFERRED EMBODIMENTS

Figure 1:
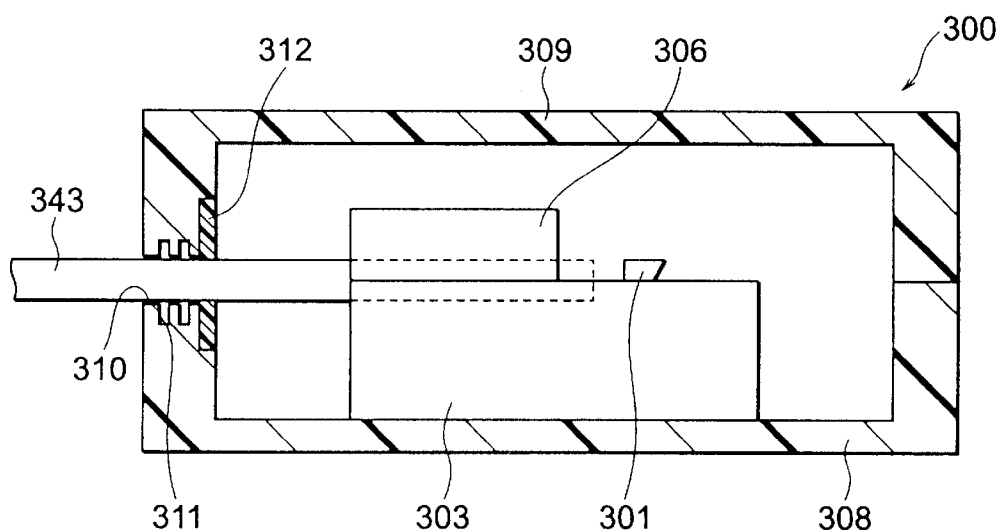
FIG. 1 is a sectional view showing a conventional optical semiconductor module.
Figure 2:
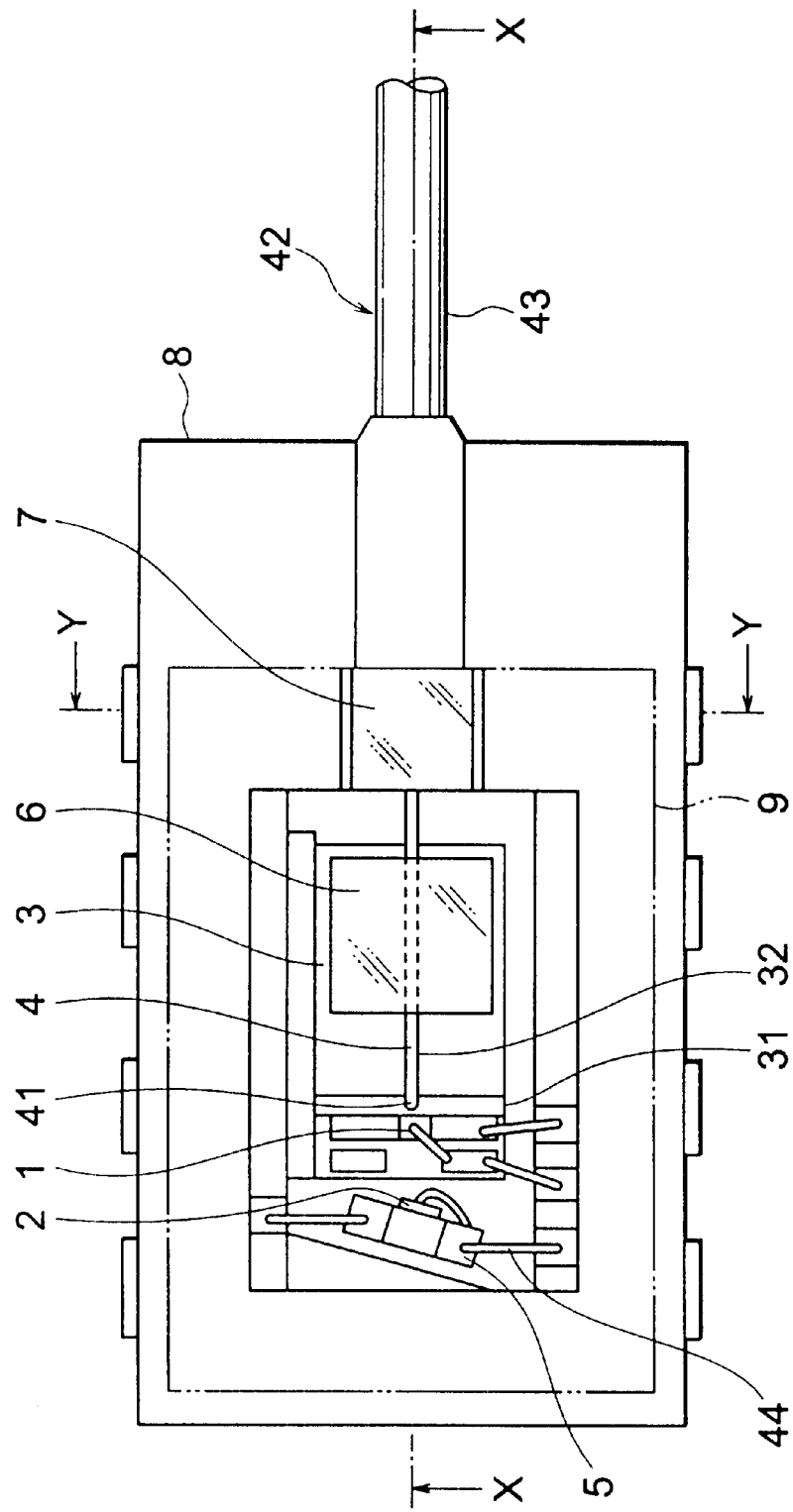
FIG. 2 is a plan view showing an optical semiconductor module according to a first embodiment of the present invention.
Figure 3:
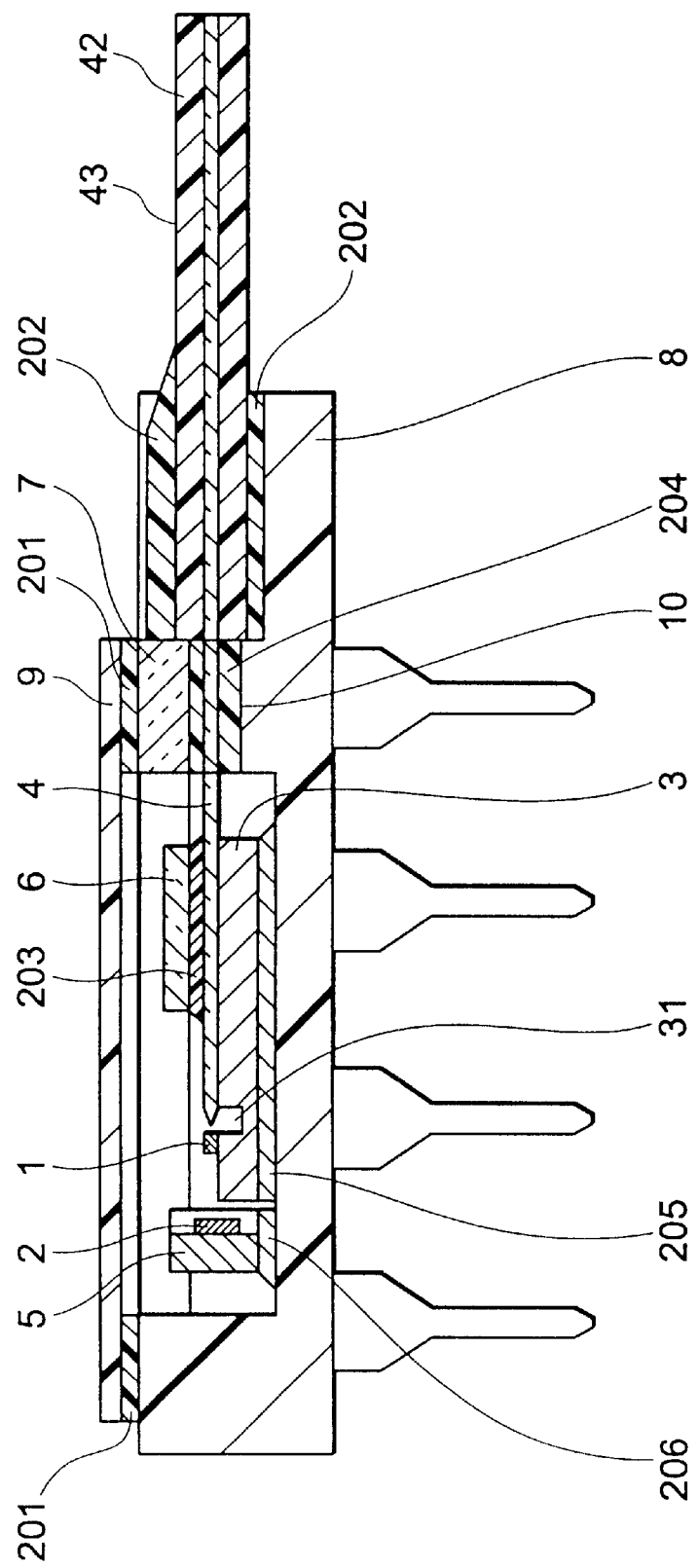
FIG. 3 is a sectional view taken along X—X line of FIG. 2, showing the optical semiconductor module according to the first embodiment of the present invention.
Figure 4:
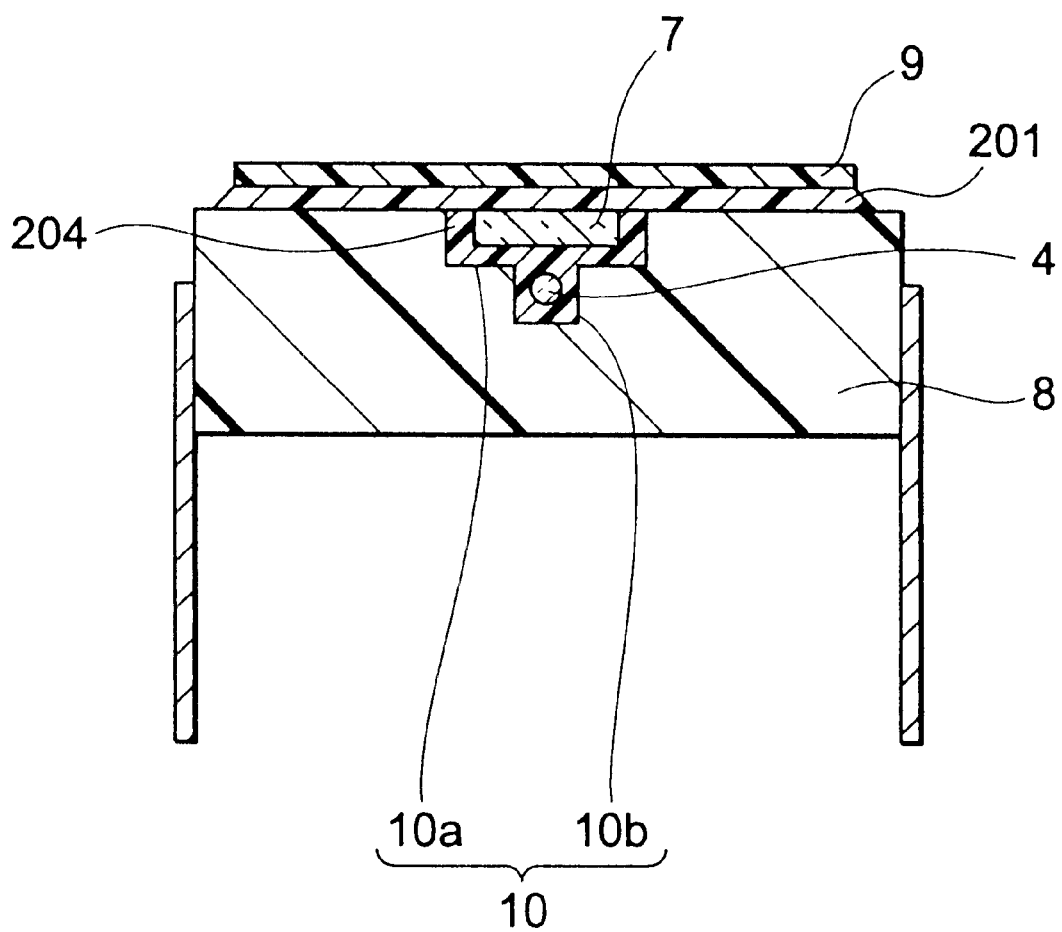
FIG. 4 is a sectional view taken along Y—Y line of FIG. 2, showing the optical semiconductor module according to the first embodiment of the present invention.

Referring to the attached drawings, an optical semiconductor module according to a first embodiment of the present invention will be specifically described. FIG. 2 is a plan view showing an optical semiconductor module according to the first embodiment of the present invention. FIG. 3 is a sectional view taken along X—X line of FIG. 2. FIG. 4 is a sectional view taken along Y—Y line of FIG. 2. In FIG. 2, a cap 9 is shown by an alternate long and two dashes line in order to make easy the grasp of the inner structure of the optical semiconductor module.

As shown in FIGS. 2 to 4, in the first embodiment, a Si substrate 3 is fixed to the bottom of a case 8 with a conductive adhesive agent 205 such as a silver paste or a AuSn solder paste. A "V"-shaped V groove 32 is made in the Si substrate 3. A groove 31 is made in the direction perpendicular to the V groove 32 extending direction at the head of the V groove 32. An optical fiber core line 4 is fixed into the V groove 32 with ultraviolet ray-curing resin 203. A round optical fiber head sphere portion 41 is formed at one end of the optical fiber core line 4. This optical fiber head sphere portion 41 projects to the groove 31. A semiconductor laser element 1 as a light emitting element is positioned, oppositely to the optical fiber head sphere portion 41, on the Si substrate 3. The semiconductor laser element 1 is fixed to pattern electrodes made on the Si substrate 3 with AuSn solder paste. The optical axis of the semiconductor laser element 1 is consistent with that of the optical fiber core line 4.

A monitoring photodiode-mounted chip carrier 5 is fixed to the bottom of the case 8 with conductive adhesive agent 206 such as silver paste or AuSn solder paste. A monitoring photodiode 2, which detects light emission of the semiconductor laser element 1, is mounted on the monitoring photodiode-mounted chip carrier 5. Metal terminals arranged in the Si substrate 3 and the monitoring photodiode-mounted chip carrier 5 are connected to desired metal terminals arranged inside the case 8 through bonding wires 44.

A glass plate 6 for pressing the optical fiber core line 4 is selectively fixed onto the optical fiber core line 4 inside the groove 32 with ultraviolet ray-curing resin 203. The cap 9 is fixed onto the case 8 with ultraviolet ray-curing resin 201. The case 8 and the cap 9 may constitute a housing. A fiber drawing-out mouth 10 is made in the case 8. In the fiber drawing-out mouth 10, for example, two-stage concave portion is formed. The width of the upper-stage concave portion 10a is larger than that of the lower-stage concave portion 10b.

The optical fiber core line 4 is fixed to the concave portion of the case 8 at the fiber drawing-out mouth 10 with an ultraviolet ray-curing resin 204. Moreover, the glass plate 7 is fixed to the position between the cap 9 and the optical fiber core line 4 with the ultraviolet ray-curing resin 204. The cap 9 protects optical connection portions between the semiconductor laser element 1, the monitoring photodiode-mounted chip carrier 5 and the optical fiber from scattered light from the outside.

In the outside of the cap 9, the optical fiber core line 4 is coated with optical fiber coating material 42. A part of the optical fiber coating material 42 is fixed to the case 8 with ultraviolet ray-curing resin 202.

The following will describe operation of the optical semiconductor module of the first embodiment, which has the above-mentioned structure.

When a given voltage is applied to the semiconductor laser element 1 arranged on the Si substrate 3, the semiconductor laser element 1 emits laser light. This laser light strikes on the optical fiber head sphere portion 41, and passes through the optical fiber core line 4 to be output to elements and the like connected to the other end of the optical fiber core line 4. The laser light is also received by the monitoring photodiode 2, which is a light receiving element, and is converted to an electrical signal. This electrical signal is output from the terminal disposed at the case 8 through the monitoring photodiode-mounted chip carrier 5 and a bonding wire 44.

Figure 5:
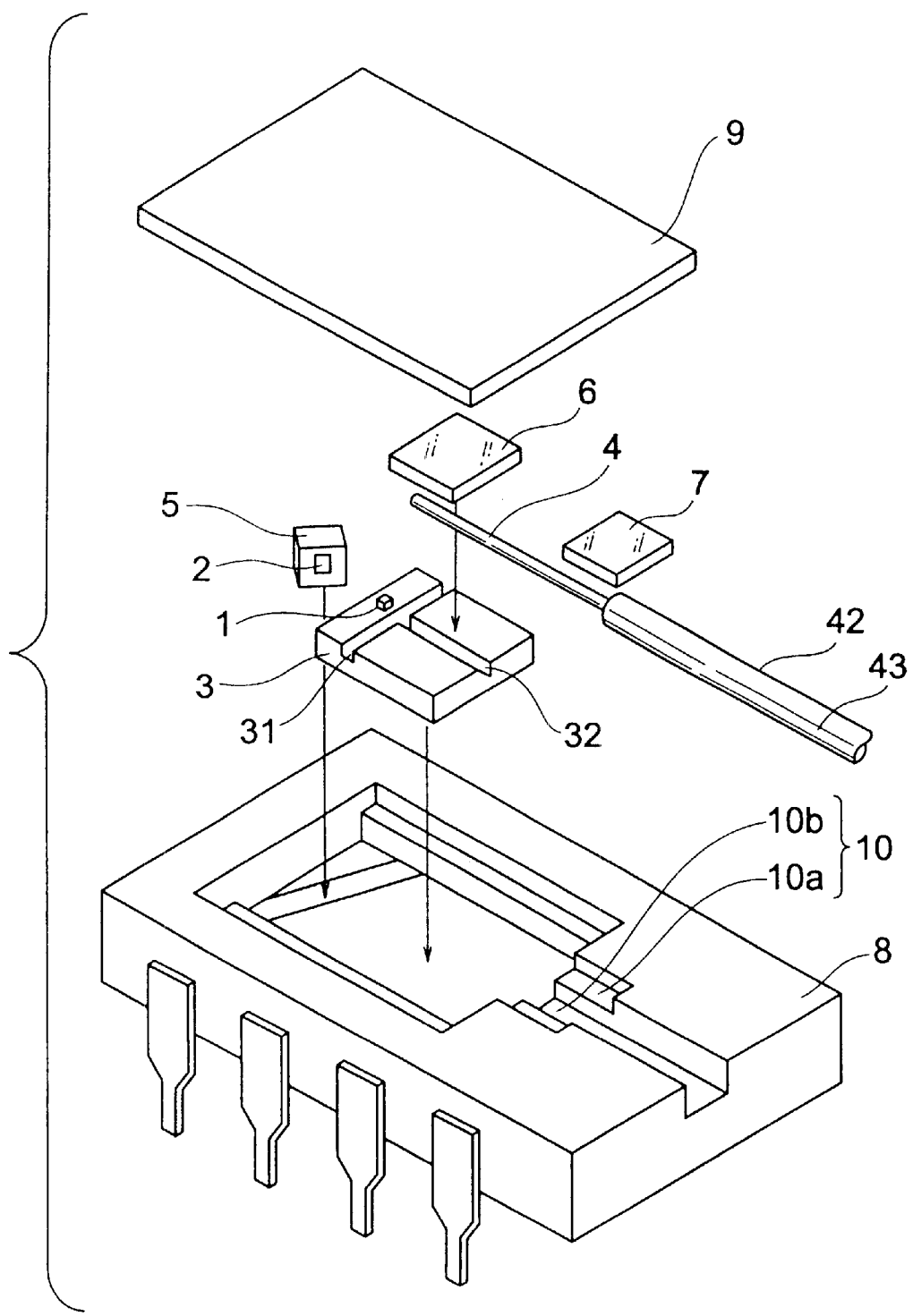
FIG. 5 is a disassembly perspective view showing a process for producing the optical semiconductor module according to the first embodiment of the present invention.

The following will describe a process for producing the optical semiconductor module according to the first embodiment. FIG. 5 is a disassembly perspective view showing the process for producing the optical semiconductor module according to the first embodiment of the present invention.

As shown in FIG. 5, AuSn solder paste is, first, vapor-deposited on the pattern electrodes, which are arranged at the positions opposite to the V groove 32 sandwiching the groove 31 of the Si substrate 3 with the V groove 32. The semiconductor laser element 1 is fixed onto the electrodes with the AuSn solder paste. At this time, the fixation is performed in such precision that the gap between the center of the V groove and that of the semiconductor laser element 1 is within, e.g., ±1.5 μm.

Next, the Si substrate 3 and the monitoring photodiode-mounted chip carrier 5 are caused to adhere to the case 8 with the conductive adhesive agents 205 and 206 such as silver paste or AuSn solder paste. Subsequently, the metal terminals of the Si substrate 3 and the monitoring photodiode-mounted chip carrier 5 are bonded to desired metal terminals inside the case 8 with the bonding wires 44. Next, the semiconductor laser element 1 is subjected to electric conduction screening (ACC). If an initial trouble is generated in the semiconductor laser element 1, the element 1 is removed.

Next, the optical fiber core line 4 is inserted from the fiber drawing-out mouth 10 to the V groove 32 made in the Si substrate 3. Thereafter, the ultraviolet ray-curing resin 203 is dropped onto the optical fiber core line 4 positioned in the V groove 32, and then the glass plate 6 for pressing the optical core line is set on the optical fiber core line 4. While a given pressure is applied to the glass plate 6 for pressing the optical core line from the upper thereof, ultraviolet rays are radiated to the resin 203, for example, under conditions that the intensity thereof is 95 mW/cm$^2$ and the radiation time thereof is 60 seconds. In this way, the optical fiber core line 4 is fixed into the V groove 32 of the Si substrate 3. At this time, by dropping the ultraviolet ray-curing resin 202 onto the periphery of the optical fiber coating material 42 and curing this material, the optical fiber coating material 42 is temporarily fixed to the case 8.

Next, the ultraviolet ray-curing resin 204 is dropped to the periphery of the optical fiber core line 4 positioned in the lower-step concave portion 10b of the fiber drawing-out mouth 10, and then the glass plate 7 having a light-transmission ratio of, for example, 98% or more is put on the upper-step concave 10a of the fiber drawing-out mouth 10. The glass plate 7 is pressed against the concave portion 10a and subsequently ultraviolet rays are uniformly radiated from three directions, for example, to the ultraviolet ray-curing resin 204, for example, under conditions that the intensity thereof is 200 mW/cm$^2$ and the radiation time thereof is 60 seconds. In this way, the ultraviolet rays sufficiently reach every part of the lower-concave portion 10b and the ultraviolet ray-curing resin 204 is cured so that the optical fiber core line 4 is fixed to the case 8. Next, the ultraviolet ray-curing resin 201 is applied to given areas of the case 8 and the glass plate 7, and then the cap 9 is put on the case 8 in place. Next, the ultraviolet ray-curing resin 201 is cured by radiation of ultraviolet rays. Thus, the cap 9 is fixed onto the case 8, so that the fiber drawing-out mouth 10 is sealed.

Next, for example, the ultraviolet ray-curing resin 202 is applied to the periphery of the optical fiber 43. By curing this resin, the optical fiber 43 is fixed to the case 8.

In such a producing process, the fiber drawing-out mouth 10 can be sealed only by dropping of the ultraviolet ray-curing resin 204 and the curing of the ultraviolet ray-curing resin 204 through the radiation of the ultraviolet rays. Since the glass plate 7 makes it possible to prevent flowing-out of the ultraviolet ray-curing resin 204 and the positioning of the optical fiber core line 4, it is possible to prevent incorporation of the moisture from the outside and a deterioration in output.

In the first embodiment, the semiconductor laser element, which is a light emitting element, is used as the optical semiconductor element. However, the optical semiconductor element may be a different element such as any different light emitting element, a light receiving element, or a semiconductor optical amplifier. In order to fix the optical fiber 43, the ultraviolet ray-curing resin 202 is used but thermosetting resin or the like may be used.

The first embodiment has a structure wherein a laser signal output from the semiconductor laser element is optically transmitted through a single optical fiber, but may be a structure wherein plural laser signals are optically transmitted through an optical fiber array having plural optical fibers, using a device having plural light emitting elements, for example, a semiconductor laser array.

Figure 6:
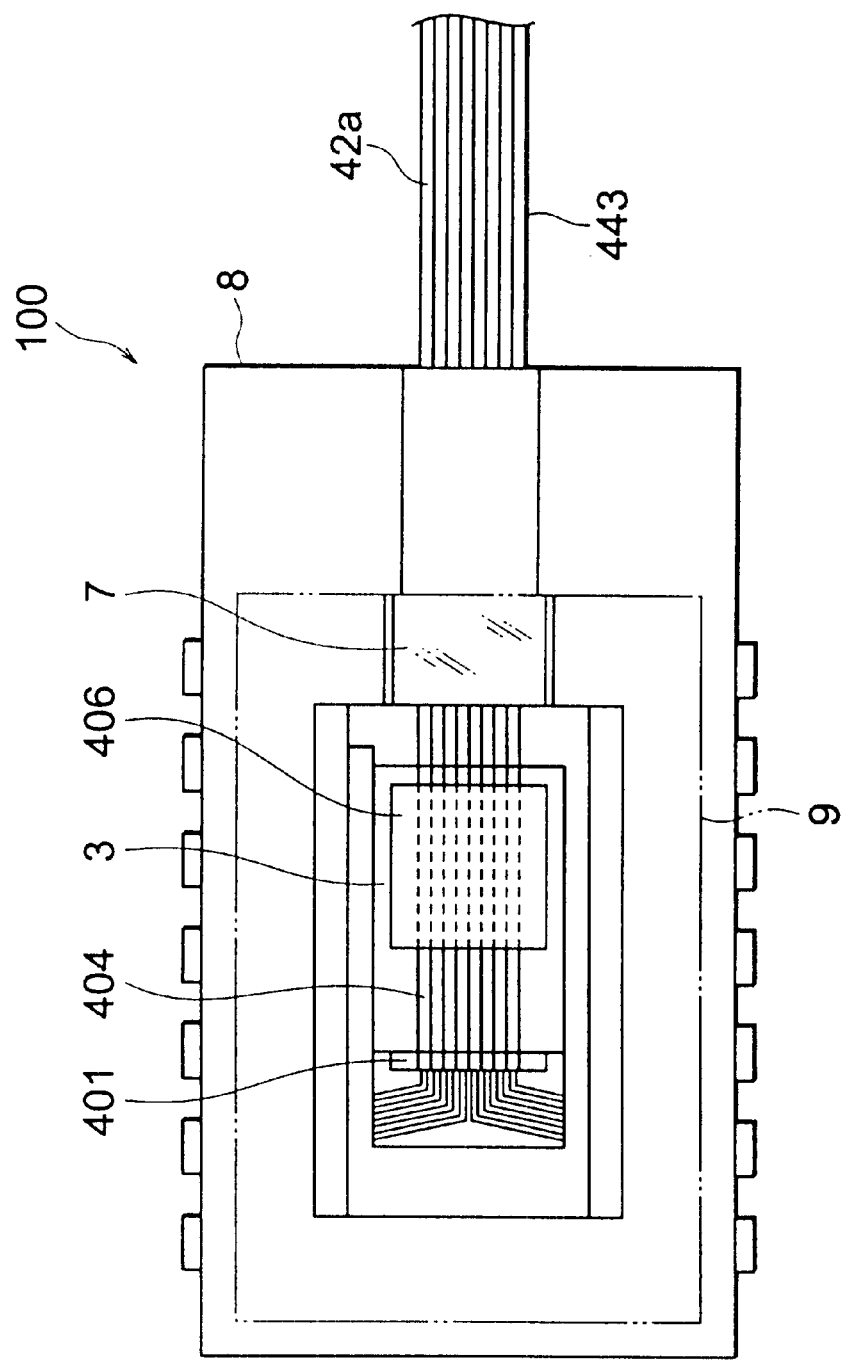
FIG. 6 is a plan view showing an optical semiconductor module according to a second embodiment of the present invention.

The following will describe an optical semiconductor module using a semiconductor laser array according to a second embodiment of the present invention. FIG. 6 is a plan view showing the optical semiconductor module according to the second embodiment of the present invention. In FIG. 6, a cap 9 is shown by an alternate long and two dashes line in order to make easy the grasp of the inner structure of the optical semiconductor module. The same reference numbers as in FIG. 6 are attached to the same constituents as in the first embodiment shown in FIG. 2, and the explanation thereof is omitted.

In the second embodiment, plural "V"-shaped grooves are made in the Si substrate 3. Plural optical fiber core lines are fixed into these grooves with, for example, an ultraviolet ray-curing resin. The plural optical fiber core lines may constitute a tape-form optical fiber array 443. In the outside of the case 8, the periphery of the tape-form optical fiber array 443 is coated with a coating material (non shown). These constitute an optical fiber 42a. A semiconductor laser array 401 comprising plural semiconductor laser elements is arranged oppositely to the top end of the tape-form optical fiber array 443 inside the housing. The optical axis of the semiconductor laser array 401 is consistent with that of the tape-form optical fiber array 443.

An optical fiber array-pressing plate 406 is selectively fixed onto the tape-form optical fiber array 443 inside the V grooves with ultraviolet ray-curing resin. The glass plate 7 is fixed to the fiber drawing-out mouth 10 with an ultraviolet ray-curing resin.

The optical semiconductor module having such a structure can be produced by substantially the same steps as for producing the optical semiconductor module of the first embodiment. That is, the ultraviolet ray-curing resin is dropped onto the tape-form optical fiber array 443 inside the V grooves. While the optical fiber array-pressing plate 406 is pressed against the tape-form optical fiber array 443, ultraviolet rays are radiated to the resin. In this way, this ultraviolet ray-curing resin is cured. Thereafter, in the fiber drawing-out mouth 10, the ultraviolet ray-curing resin is dropped onto the periphery of the tape-form optical fiber array 443, and then the glass plate 7 is put on the upper-concave portion of the fiber drawing-out mouth 10. Ultraviolet rays are then radiated thereto, so as to cure the ultraviolet ray-curing resin.

In the first and second embodiments, it is desired to set the following to less than $1 \times 10^{-5}/°C$. in order to prevent cracks upon the curing of the resin: the difference between the linear expansion coefficient of the ultraviolet ray-curing resin used in the sealing of the fiber drawing-out mouth 10 and that of the case.

According to the present invention, air bubbles are not produced and airtight sealing can be easily and surely attained because an opening that an optical fiber penetrates is sealed with a photo-curing resin. Therefore, the reliability of an optical semiconductor module can be improved. Moreover, the number of producing steps can be decreased so that costs can be reduced. Furthermore, optical fibers can be still more easily fixed by making a concave opening portion having at least two steps in the opening.

What is claimed is:

1. An optical semiconductor module comprising:

a housing having an opening;

an optical semiconductor element provided in said housing;

an optical fiber that penetrates said opening, said optical fiber performing optical transmission between said optical semiconductor element and an element arranged outside said housing;

photo-curing resin sealing said opening; and a transparent plate arranged between said photo-curing resin and the outside of said housing.

2. The optical semiconductor module according to claim 1, wherein said housing comprises a case on which said optical semiconductor element is mounted, and a cap fitted to said case, and the difference between the linear expansion coefficient of said photo-curing resin and that of said case is less than $1 \times 10^{-5}/°C$.

3. The optical semiconductor module according to claim 1, wherein the light transmission ratio of said transparent plate is equal to or more than 98%.

4. The optical semiconductor module according to claim 2, wherein the light transmission ratio of said transparent plate is equal to or more than 98%.

5. The optical semiconductor module according to claim 1, wherein said opening comprises a concave opening portion having at least two stages, and said optical fiber and said transparent plate are arranged on different stages from each other.

6. The optical semiconductor module according to claim 2, wherein said opening comprises a concave opening portion having at least two stages, and said optical fiber and said transparent plate are arranged on different stages from each other.

7. The optical semiconductor module according to claim 3, wherein said opening comprises a concave opening portion having at least two stages, and said optical fiber and said transparent plate are arranged on different stages from each other.

8. The optical semiconductor module according to claim 4, wherein said opening comprises a concave opening portion having at least two stages, and said optical fiber and said transparent plate are arranged on different stages from each other.

9. A process for producing an optical semiconductor module, comprising the steps of:

putting an optical semiconductor element inside a case;

arranging an optical fiber in said case, said optical fiber performing optical transmission between said optical semiconductor element and an element arranged outside said case;

providing photo-curing resin to areas where side walls of said case and said optical fiber cross each other;

putting a transparent plate on said photo-curing resin; and radiating light onto said photo-curing resin through said transparent plate to cure said photo-curing resin.

10. The process for producing an optical semiconductor module according to claim 9, wherein the difference between the linear expansion coefficient of said photo-curing resin and that of said case is less than $1 \times 10^{-5}/°C$.

11. The process for producing an optical semiconductor module according to claim 9, wherein the light transmission ratio of said transparent plate is equal to or more than 98%.

12. The process for producing an optical semiconductor module according to claim 10, wherein the light transmission ratio of said transparent plate is equal to or more than 98%.

* * * * *

UNITED STATES PATENT AND TRADEMARK OFFICE
CERTIFICATE OF CORRECTION

PATENT NO. : 6,485,197 B1
DATED : November 26, 2002
INVENTOR(S) : Kato

It is certified that error appears in the above-identified patent and that said Letters Patent is hereby corrected as shown below:

<u>Title page,</u>
Item [30], Foreign Application Priority Data, "February 4, 1999" should be -- April 2, 1999 --.

Signed and Sealed this

Thirteenth Day of July, 2004

JON W. DUDAS
*Acting Director of the United States Patent and Trademark Office*